(12) United States Patent
Hataguchi et al.

(10) Patent No.: US 7,265,336 B2
(45) Date of Patent: Sep. 4, 2007

(54) ENCODER UTILIZING A REFLECTIVE CYLINDRICAL SURFACE

(75) Inventors: Toshiya Hataguchi, Bessho Hachiouji (JP); Yee Loong Chin, Taman Pinji Mewah (MY); Kok Hing Fo, Kampung Benggali (MY); Srinivasan Lakshmanan, Greenlane (MY); Lai Hing Chua, Persiaran Batu Uban (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 115 days.

(21) Appl. No.: 10/725,696

(22) Filed: Dec. 1, 2003

(65) Prior Publication Data

US 2005/0116153 A1 Jun. 2, 2005

(51) Int. Cl.
*G01D 5/34* (2006.01)
(52) U.S. Cl. ............... 250/231.13; 250/231.18
(58) Field of Classification Search ........... 250/231.13, 250/231.14, 231.18, 208.6, 214 R, 214.1, 250/555
See application file for complete search history.

(56) References Cited

U.S. PATENT DOCUMENTS

| | | | | |
|---|---|---|---|---|
| 4,124,839 A | * | 11/1978 | Cohen | 340/870.02 |
| 4,987,299 A | | 1/1991 | Kobayashi et al. | |
| 5,438,882 A | * | 8/1995 | Karim-Panahi et al. | 73/862.324 |
| 5,471,054 A | * | 11/1995 | Watanabe | 250/231.13 |
| 5,734,108 A | * | 3/1998 | Walker et al. | 73/650 |
| 6,448,996 B2 | * | 9/2002 | Suganuma | 347/248 |
| 6,459,389 B1 | * | 10/2002 | Germuth-Loffler et al. | 341/13 |
| 6,587,211 B1 | * | 7/2003 | Gelbart | 356/499 |
| 6,639,206 B1 | * | 10/2003 | Rothamel et al. | 250/231.13 |
| 6,817,528 B2 | * | 11/2004 | Chen | 235/462.13 |
| 2002/0195551 A1 | * | 12/2002 | Baxter et al. | 250/231.13 |

FOREIGN PATENT DOCUMENTS

| | | |
|---|---|---|
| DE | 39 27 846 | 3/1990 |
| DE | 197 05 312 | 8/1998 |
| DE | 197 58 104 | 7/1999 |
| EP | 0 146 303 B1 | 9/1991 |

OTHER PUBLICATIONS

German Office Action dated Jun. 22, 2006 involving counterpart German application No. 10 2004 048237.3-52.
English Translation of German Office Action dated Jun. 22, 2006 involving counterpart German application No. 10 2004 048237.3-52.

* cited by examiner

*Primary Examiner*—Georgia Epps
*Assistant Examiner*—Kevin Wyatt

(57) ABSTRACT

An encoder for measuring the position of a rotating shaft is disclosed. The encoder includes a drum having an encoding track thereon and a detector module having a light source and a photodetector. The drum includes a cylindrical surface characterized by an axis, the drum having a surface with a normal perpendicular to the axis. The encoding track includes a plurality of alternating reflective and non-reflective stripes arranged on the cylindrical surface. The first light source illuminates the stripes at an opaque angle relative to the normal. The first photodetector is positioned to receive light from the light source that is reflected from the reflective stripes when the drum moves relative to the photodetector. In one embodiment, the drum rotates about the axis when the shaft rotates. The encoding track can be either on the inside or outside of the drum.

8 Claims, 5 Drawing Sheets

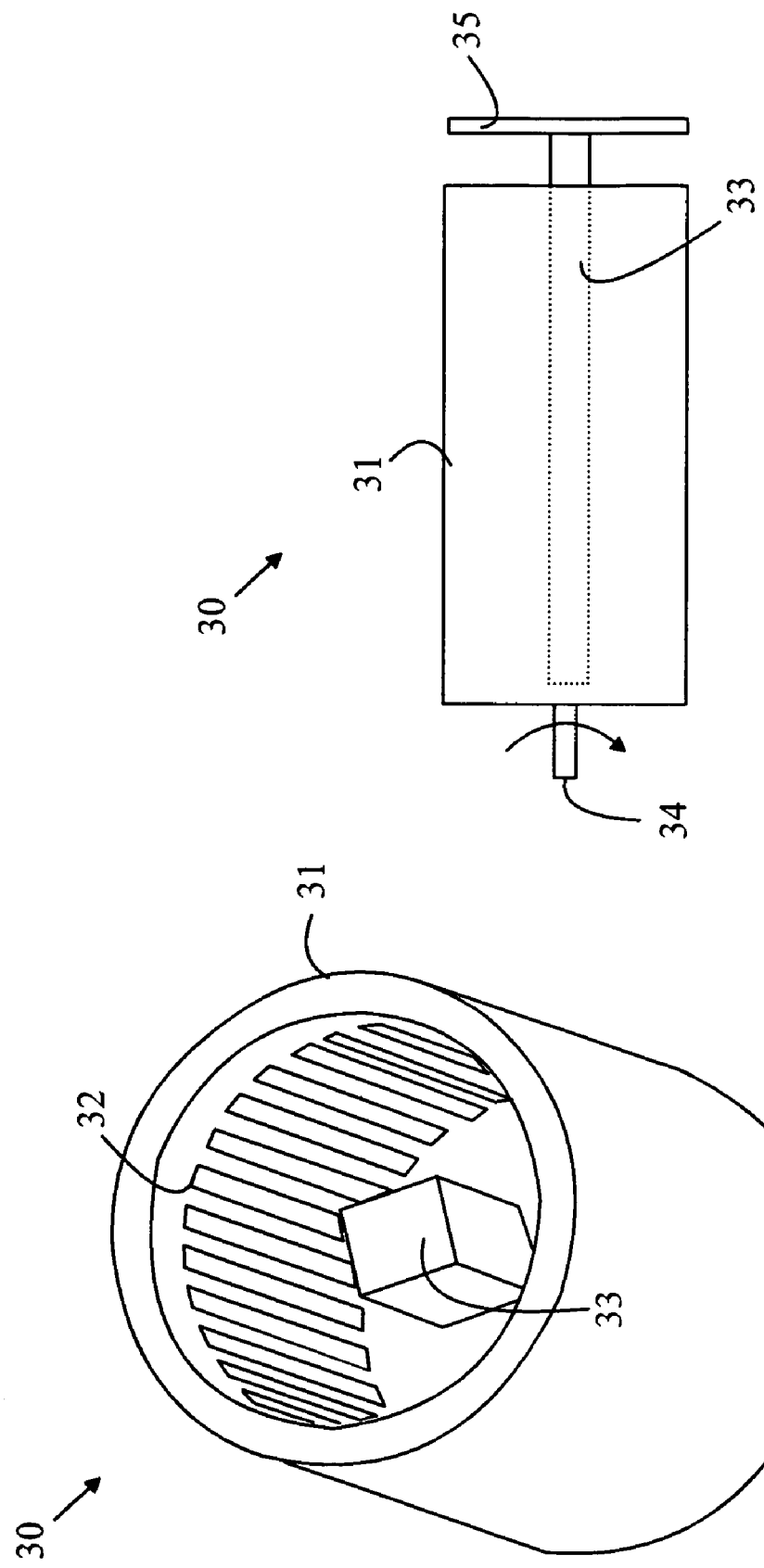

ENCODER UTILIZING A REFLECTIVE CYLINDRICAL SURFACE

FIELD OF THE INVENTION

The present invention relates to optical encoding devices.

BACKGROUND OF THE INVENTION

Optical shaft encoders are used to measure the position rotation of a shaft. An optical encoder typically includes a light source, an encoding strip mounted on a disk that moves with the shaft and which modulates the light from the light source, and a photodetector assembly that converts the modulated light signal into electrical signals used for determining the shaft position.

Incremental encoders generate a signal each time the shaft moves through a predetermined angle. If the photodetector assembly includes two photodetectors that are displaced from one another, both the direction and magnitude of the shaft motion can be determined from the signals generated by these photodetectors. A plurality of incremental encoders operating on different "tracks" on the encoding strip can be used to construct an absolute encoder that generates a signal indicative of the position of the shaft relative to a predetermined fixed reference point.

The encoding strips used in both types of encoders can be divided into two broad types. In the first type, the encoding strip consists of alternating opaque and transparent stripes, and the light source and detector array are on opposite sides of the encoding strip. In the second type, the encoding strip consists of alternating non-reflective stripes and reflective stripes, and the light source and detector array are on the same side of the encoding strip.

Encoders of the second type are, in principle, less expensive than encoders of the first type, since the light source and detector array can be combined into a single pre-packaged assembly. One such encoder design is taught in U.S. Pat. No. 5,317,149. This design utilizes two lenses in addition to the light source and the detector array. The first lens is used to generate a light beam that is reflected from the code strip. The second lens images the code strip onto the photodetector array. The cost of the second lens increases the cost of the encoder.

In addition, a single encoder module that will function adequately for a wide range of encoder resolutions is difficult to achieve using this design. The encoding strip is typically constructed by placing the stripe pattern on a disk that rotates with the shaft. The desired resolution sets the pattern of stripes on the encoding strip. The image of a code stripe on the photodiodes is a series of light and dark stripes having a width that must match the size of the active region on the photodiodes. For example, in the case of a two photodiode array used for determining both the direction of motion and the amount of motion, the stripes in the code strip image ideally have a width that is twice the width of the active area on the photodiode. Since the dimensions of the photodiodes are set in the manufacturing process and not easily changed, any mismatch in the dimensions of the stripes must be accommodated by changing the magnification provided by the second lens discussed above. As the resolution changes, the magnification factor may also change. Hence, a single design in which the first and second lenses have fixed focal lengths is often impossible to achieve.

In this type of prior art design, the shape of each stripe in the code strip pattern is a trapezoid. The stripes must be arranged around a disk that rotates with the shaft. Hence, each stripe covers an area defined by two radii on the disk and the angular resolution of the encoder. If the photodetectors have active areas that are rectangles, there is a shape mis-match that reduces the signal to noise ratio in the encoder. Hence, trapezoidal photodetectors are required. This also increases the cost of the encoder, since specialized photodetectors must be utilized.

SUMMARY OF THE INVENTION

The present invention includes an encoder for measuring the position of a rotating shaft. The encoder includes a drum having an encoding track thereon and a detector module having a light source and a photodetector. The drum includes a cylindrical surface characterized by an axis, the drum having a surface with a normal perpendicular to the axis. The encoding track includes a plurality of alternating reflective and non-reflective stripes arranged on the cylindrical surface. The first light source illuminates the stripes at an opaque angle relative to the normal. The first photodetector is positioned to receive light from the light source that is reflected from the reflective stripes when the drum moves relative to the photodetector. In one embodiment, the drum rotates about the axis when the shaft rotates. The encoding track can be either on the inside or outside of the drum. An absolute encoder can be constructed by including a plurality of encoding tracks in which the stripes have widths that vary from track to track.

BRIEF DESCRIPTION OF THE DRAWINGS

FIG. 6 is a perspective view of another embodiment of an encoder according to the present invention in which the encoding stripes are on the inside of the drum surface.

FIG. 7 is a side view of the encoder shown in FIG. 6.

DETAILED DESCRIPTION OF THE PREFERRED EMBODIMENTS OF THE INVENTION

Figure 1:
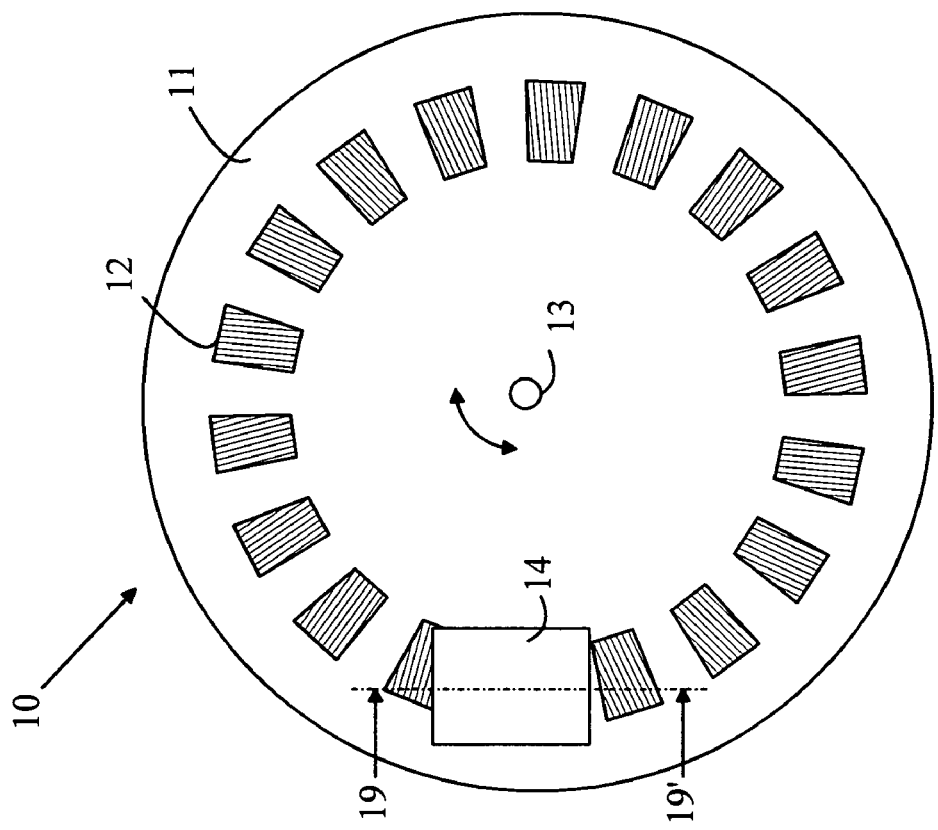
FIG. 1 is a top view of a prior art encoder that encodes the position of a shaft.
Figure 2:
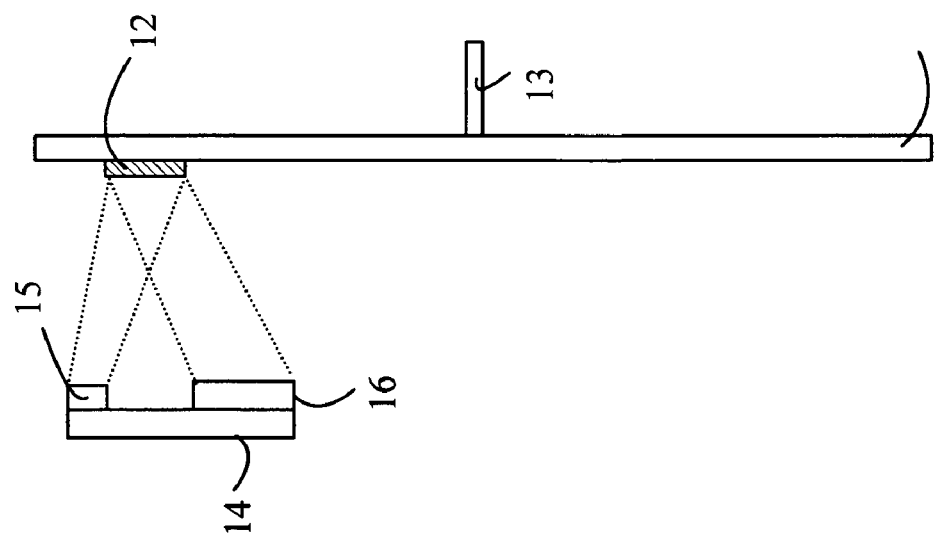
FIG. 2 is a cross-sectional view of the encoder shown in FIG. 1 through line 19-19'.

The manner in which the present invention provides its advantages can be more easily understood with reference to FIGS. 1 and 2, which illustrate a prior art encoder for encoding the position of a shaft 13. FIG. 1 is a top view of encoder 10 and FIG. 2 is a cross-sectional view of encoder 10 through line 19-19'. Encoder 10 is constructed from a reflective disk 11 having trapezoid-shaped non-reflective areas 12 that divide the disk into a plurality of reflective and non-reflective areas. A detector module 14 includes a light source 15 and a detector array 16 for generating signals indicative of the motion of disk 11. The angular resolution of encoder 10 is determined by the number of reflective and non-reflective areas. Hence, to increase the resolution of the encoder, the number of areas must be increased. If the radius of disk 11 is not increased, the size of each area must be decreased. Such a decrease also results in a decrease in the amount of light that is available for detecting the differences between the reflective and non-reflective areas. Hence, as the resolution is increased, the signal to noise ratio decreases.

As noted above, detector array 16 typically includes a lens that sets the size of the image of each strip on the surface of the detector array. As the resolution changes, either the magnification of this imaging system must change or the active area of the photodiodes must be changed. In either case, it is difficult to provide a detector array that can be utilized with a wide range of resolutions.

Figure 3:
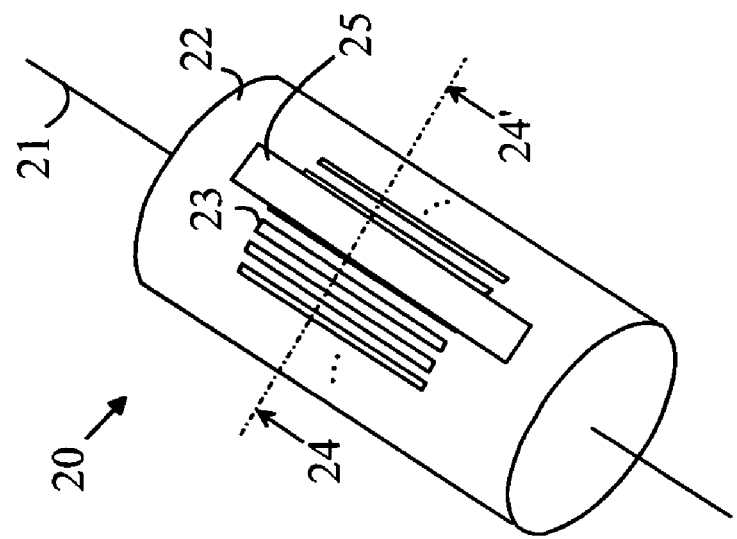
FIG. 3 is a perspective view of an encoder according to one embodiment of the present invention.
Figure 4:
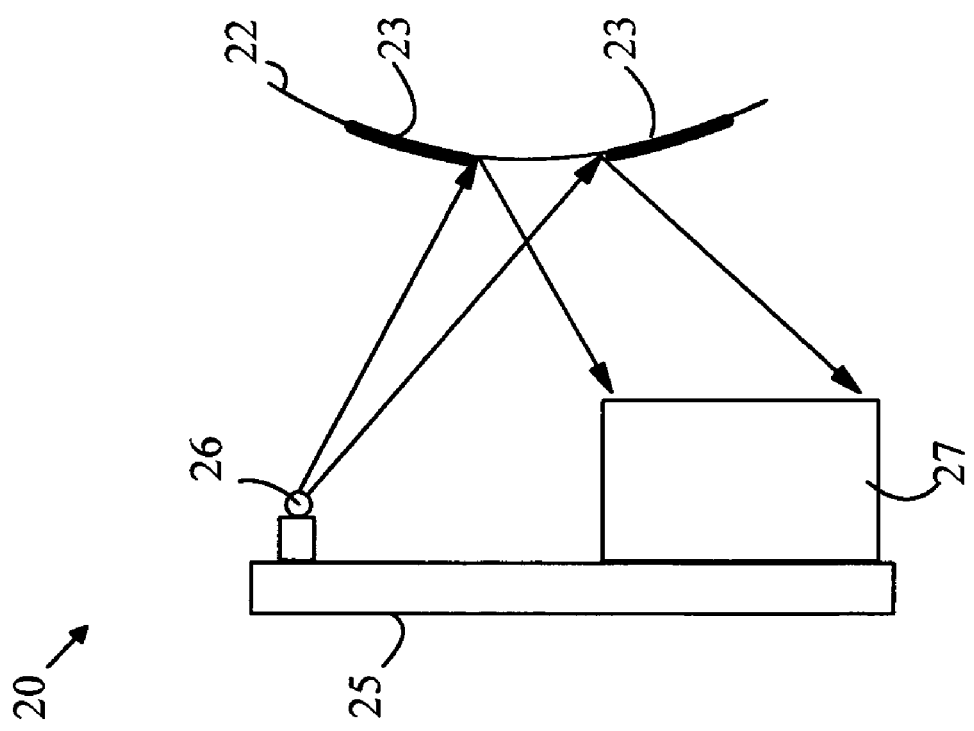
FIG. 4 is a cross-sectional view of a portion of the encoder shown in FIG. 3 through line 24-24'.

The present invention avoids these problems by utilizing a reflective drum for the encoding surface. Refer now to FIGS. 3 and 4, which illustrate an encoder 20 according to one embodiment of the present invention. FIG. 3 is a perspective view of encoder 20, and FIG. 4 is a cross-sectional view of a portion of encoder 20 through line 24-24'. The function of the encoding strip is provided by the non-reflective areas shown at 23, which divide the surface of the drum into reflective and non-reflective regions. The reflective and non-reflective regions are preferably rectangular in shape. The axis 21 of drum 22 can be coincident with the axis of the shaft whose position is being encoded or coupled to that shaft by an appropriate coupling mechanism. A detector module 25 includes a light source 26 and one or more photodetectors 27.

Figure 5:
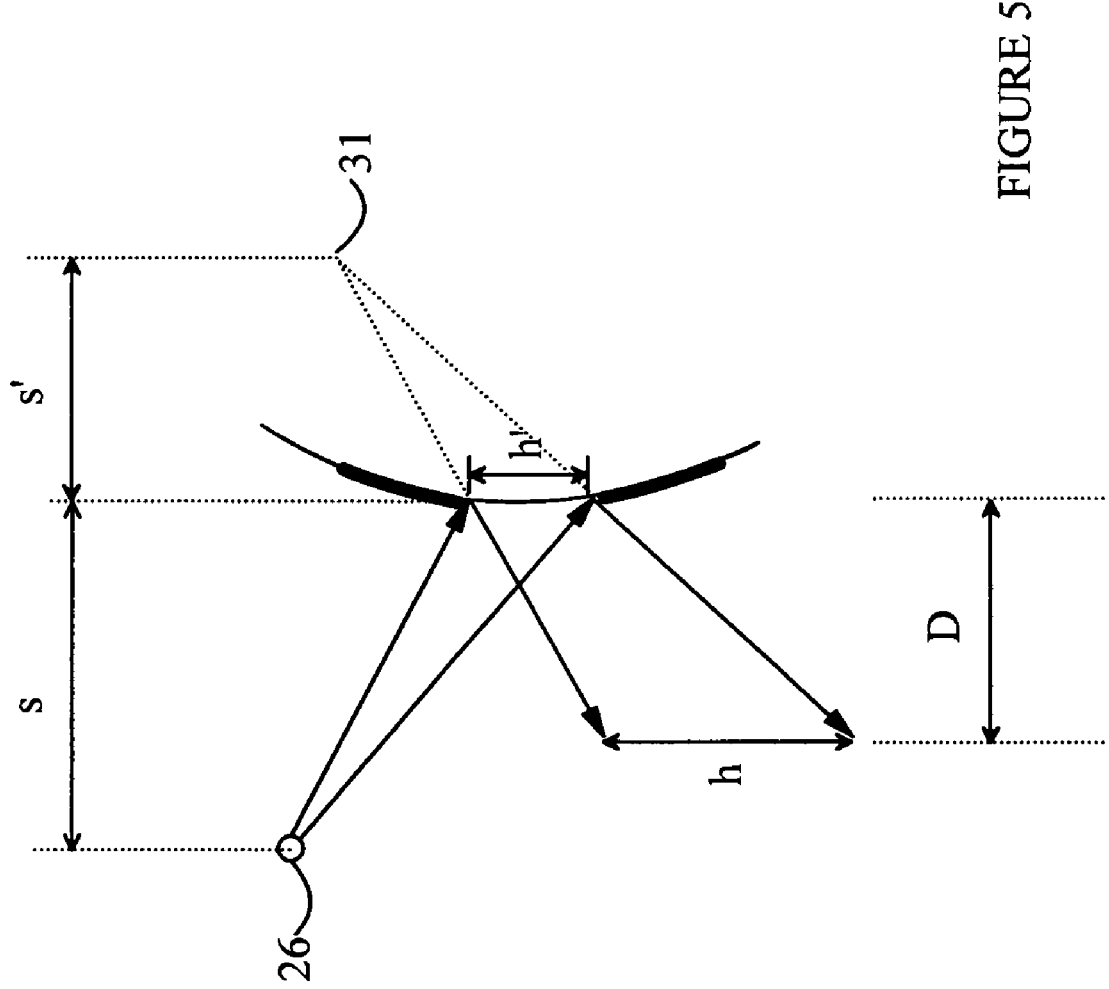
FIG. 5 illustrates the relevant distances in the encoder shown in FIGS. 3 and 4.

Refer now to FIG. 5, which illustrates the relevant distances in encoder 20. For the purposes of this discussion, it will be assumed that drum 22 is illuminated by a non-collimated source 26 located a distance S away from drum 22. It will also be assumed that the light from the light source strikes the surface of the drum at an angle relative to the normal to the surface. In this case, the convex surface of the drum forms a virtual image of light source 26 at 31. If the width of the reflective area is denoted by h, the apparent width of the reflective area at the photodetector will be h', and hence, the encoding stripes will be magnified. The amount of the magnification is approximately given by $M=1+D(|f|^{-1}+S^{-1})$. Here, D is the distance from the drum to the photodetector and f is the focal length of the convex mirror surface. It should be noted that f is positive for a concave mirror and negative for a convex mirror such as that shown in FIG. 5. Hence, by varying D, and S, the magnification can be altered. If the photodetector and the light source are in the same module, then varying the distance of the module from the surface allows the magnification to be adjusted to match the code strip widths on the drum. For example, if D=S, then the magnification is $2+D/|f|$.

The above-described embodiment utilized a non-collimated light source. If the light source is collimated, S is infinity. In this case, $M=1+D/|f|$.

As will be appreciated from the preceding discussion, the present invention avoids the limitations inherent in designs that require an imaging lens. By adjusting the distance between the drum and the photodetectors, different encoding strip resolutions can be accommodated with the same detector module without altering the optics of that module. Accordingly, a single detector module design can be utilized for a range of encoders.

In addition, an encoder according to the present invention can provide greater resolution than a prior art encoder based on a code strip mounted on a disk having the same radius as the drum. The effective radius at which the code strips are placed in a disk-based encoder such as that shown in FIG. 1 is less than the radius of the disk itself. In addition, there is a minimum width for the strips that is determined by the amount of light that is reflected from the reflective stripes. The amount of light reflected from a stripe is proportional to the area of the stripe. The number of stripes is proportional to the effective radius divided by the stripe width. If one attempts to increase the area by utilizing longer stripes in a disk-based design, the effective radius of the track having the stripes is decreased. Furthermore, the maximum length of a stripe in a disk-based design is limited to the radius of the disk. In contrast, the radius at which the code strips are placed in a drum-based design is the full radius of the drum. In addition, the area of the stripes can be increased by using a longer drum without altering the width of the stripes. Hence, the drum-based design can provide substantially greater resolution.

In the above-described embodiments of the present invention, the encoding stripes were placed on the outer surface of a drum that rotated in response to the shaft rotating and the detector module was fixed to some support that remained stationary when the shaft rotated. However, embodiments of the present invention in which the encoding stripes are placed on the inside of a reflecting drum can also be utilized. Refer now to FIGS. 6 and 7, which illustrate an embodiment of the present invention in which the encoding stripes are on the inside of the drum surface. FIG. 6 is a perspective view of encoder 30, and FIG. 7 is a side view of encoder 30. Encoder 30 includes a drum 31 having a reflective inside surface on which non-reflective strips 32 are placed to form a series of alternating reflective and non-reflective encoding stripes. The stripes are illuminated by a light source in a detector module 33. Detector module 33 also includes one or more photodetectors for sensing light reflected from the encoding stripes. Drum 31 is preferably coupled to a shaft 34 having an axis that is coincident with the axis of drum 31 such that drum 31 rotates when shaft 34 rotates. Detector module 33 is mounted to a surface 35 that remain stationary when drum 31 rotates. In one embodiment, surface 35 forms a cap that covers the end of drum 31 that is not attached to shaft 34. The cap is displaced from drum 31 sufficiently to allow the drum to rotate while the cap remains stationary. If the gap between the cap and the drum is sufficiently small, detector module 33 and the inner surface of drum 31 are effectively enclosed and isolated from the outside environment, and hence, are protected from dirt in that environment.

The above-described embodiment of the present invention utilizes a detector module that remains stationary while the drum rotates about its axis. This is the preferred embodiment, since the power and signal connections to the components in the detector module do not have to accommodate any motion. However, one can construct embodiments in which the detector module rotates about the axis of the drum while the drum remains fixed.

The above-described embodiments of the present invention have been described in terms of a reflective surface in which non-reflecting stripes have been deposited. However, the pattern of alternating reflective and non-reflective stripes can be created by any mechanism that results in the desired pattern of stripes.

The above-described embodiments of the present invention utilize a single code strip. Such embodiments provide the functionality of an incremental encoder. However, the present invention can be utilized to construct absolute encoders. An absolute encoder provides a readout of the position of the shaft relative to some predetermined location. For example, an absolute shaft encoder provides a readout of the number of degrees the shaft would need to be rotated to return to a predetermined starting position.

Figure 8:
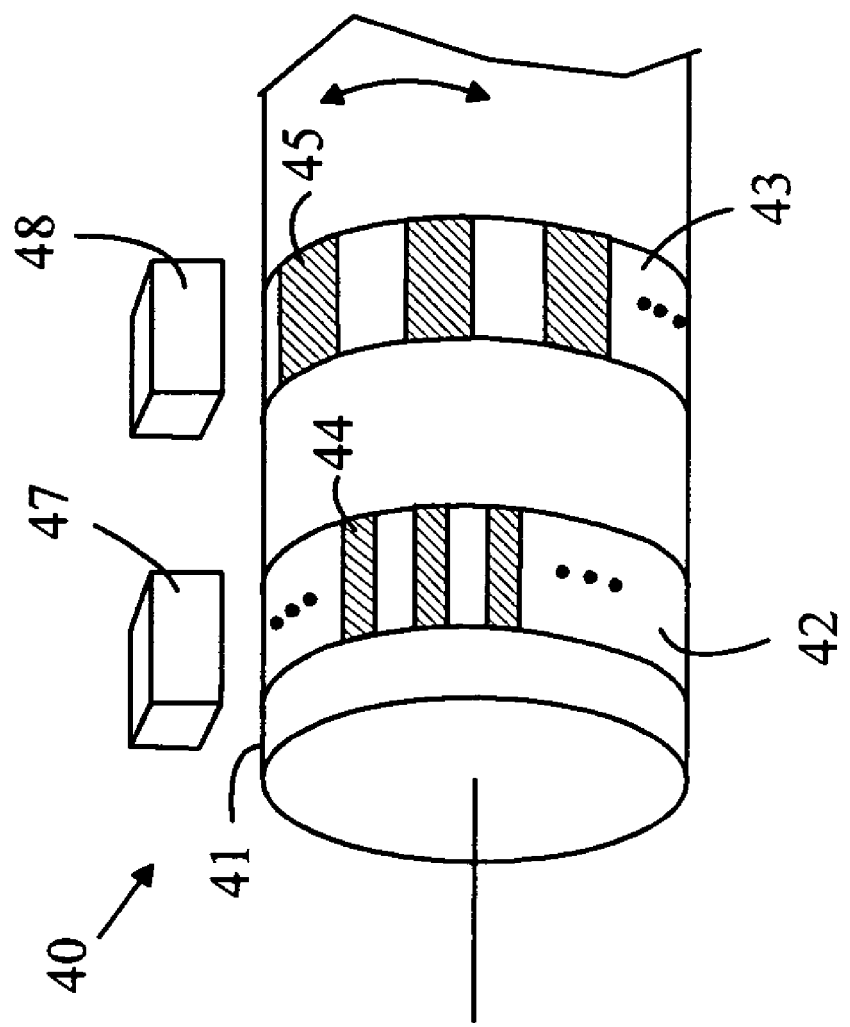
FIG. 8 is a perspective view of a portion of an absolute encoder according to another embodiment of the present invention.

Refer now to FIG. 8, which is a perspective view of a portion of an absolute encoder 40 according to another embodiment of the present invention. In general, if the device provides an N-bit readout of the location, there are N separate code strips, one per bit. There are also N separate detector modules, one per track. Two such tracks are shown in FIG. 8 at 42 and 43. The tracks are on the surface of a cylindrical drum 41 in a manner analogous to that described above, and the detectors 47 and 48 are located so as to remain fixed relative to the moving drum. Each detector has a light source and a photodetector that operate in a manner analogous to that described above. Each detector provides a signal when one of the associated encoding stripes passes the detector. In a binary encoder having N bits, the width of the stripes on the $k^{th}$ track is twice the width of the strips on the $(k-1)^{st}$ track. That is, strip 45 is twice the width of strip 44 in the neighboring track. The tracks are aligned with one another such that the readout of the detector module provides the $k^{th}$ bit of an N bit binary number representing the position of the shaft relative to the fixed reference position.

Various modifications to the present invention will become apparent to those skilled in the art from the foregoing description and accompanying drawings. Accordingly, the present invention is to be limited solely by the scope of the following claims.

What is claimed is:

1. An encoder comprising:
   a drum comprising a circular cylindrical surface characterized by an axis and a radius of curvature, said drum having a surface with a normal perpendicular to said axis;
   a first track comprising a plurality of alternating reflective and non-reflective stripes arranged on said circular cylindrical surface, said reflective stripes comprising a portion of a said circular cylindrical surface, each reflective stripe having a circular cylindrical outer surface having an axis coincident with said axis of said drum;
   a first light source that illuminates said outer surface of said reflective stripes at an oblique angle relative to said normal; and
   a first photodetector positioned to receive light from said light source that is reflected from said reflective stripes of said first track when said drum moves relative to said photodetector, an image of said reflective stripes of said first track being formed on said first photodetector, said image having a magnification that depends on said radius of curvature.

2. An encoder comprising:
   a drum comprising a circular cylindrical surface characterized by an axis, said drum having a surface with a normal perpendicular to said axis;
   a first track comprising a plurality of alternating reflective and non-reflective stripes arranged on said circular cylindrical surface, said reflective stripes comprising a portion of a said circular cylindrical surface;
   a first light source that illuminates said stripes at an oblique angle relative to said normal; and
   a first photodetector positioned to receive light from said light source that is reflected from said reflective stripes of said first track when said drum moves relative to said photodetector, an image of said reflective stripes of said first track being formed on said first photodetector and having a magnification that depends on said radius of curvature,
   wherein said first light source emits a collimated beam of light.

3. The encoder of claim 1 wherein said drum rotates about said axis when a shaft is rotated.

4. The encoder of claim 3 wherein said shaft is coincident with said axis.

5. The encoder of claim 1 wherein said circular cylindrical surface lies between said first track and said axis.

6. The encoder of claim 1 wherein said first track lies between said circular cylindrical surface and said axis.

7. The encoder of claim 1 further comprising:
   a second track comprising a plurality of alternating reflective and non-reflective stripes arranged on said circular cylindrical surface;
   a second light source for illuminating said stripes of said second track at an oblique angle relative to said normal; and
   a second photodetector positioned to receive light from said second light source that is reflected from said reflective stripes of said second track, wherein said drum moves relative to said second photodetector.

8. The encoder of claim 7, wherein said reflective stripes of said second track have widths that are different froni said reflective stripes of said first track.

* * * * *

UNITED STATES PATENT AND TRADEMARK OFFICE
CERTIFICATE OF CORRECTION

PATENT NO. : 7,265,336 B2  Page 1 of 1
APPLICATION NO. : 10/725696
DATED : September 4, 2007
INVENTOR(S) : Toshiya Hataguchi et al.

It is certified that error appears in the above-identified patent and that said Letters Patent is hereby corrected as shown below:

Col. 6 Line 44 In Claim 8, delete "froni" and insert -- from --, therefor.

Signed and Sealed this

Sixth Day of July, 2010

David J. Kappos
*Director of the United States Patent and Trademark Office*